United States Patent [19]

Hayashi

[11] 4,214,841
[45] Jul. 29, 1980

[54] CLAMP-CONNECTOR FOR JOINING THREE TUBULAR MEMBERS AT CORNERS

[76] Inventor: Henry T. Hayashi, 2373 Abreu Rd., Union City, Calif. 94587

[21] Appl. No.: 970,558

[22] Filed: Dec. 18, 1978

Related U.S. Application Data

[63] Continuation-in-part of Ser. No. 808,044, Jun. 20, 1977, Pat. No. 4,136,984.

[51] Int. Cl.² ............................................. F16B 9/02
[52] U.S. Cl. .................................. 403/188; 403/217; 403/231
[58] Field of Search ............... 403/170, 175, 188, 217, 403/218, 219, 231; 285/150; 248/68 R

[56] References Cited

U.S. PATENT DOCUMENTS

| 885,240 | 4/1908 | Graham | 285/150 |
|---|---|---|---|
| 885,992 | 4/1908 | Graham | 285/150 |
| 1,150,781 | 8/1915 | Louden | 403/218 |
| 2,658,776 | 11/1953 | Wilcox | 403/170 X |
| 2,696,396 | 12/1954 | Pittaluga | 403/171 |
| 2,711,917 | 6/1955 | Blu | 403/171 |
| 2,847,237 | 8/1958 | Ackerman | 403/218 |
| 3,062,570 | 11/1962 | Schwartz | 403/172 |
| 3,195,938 | 7/1965 | Rifken | 403/218 |
| 3,216,752 | 11/1965 | Rifken | 403/217 |
| 3,226,069 | 12/1965 | Clarke | 248/68 R X |
| 3,315,994 | 4/1967 | Rifken | 403/175 X |
| 3,944,175 | 3/1976 | Kearney | 248/68 R X |

FOREIGN PATENT DOCUMENTS

| 212185 | 1/1958 | Australia | 403/217 |
|---|---|---|---|
| 559535 | 7/1958 | Canada | 403/219 |
| 60228 | 4/1954 | France | 403/217 |
| 1196296 | 5/1959 | France | 403/218 |
| 600163 | 11/1959 | Italy | 403/175 |

OTHER PUBLICATIONS

*The Kee Klamp*, Bulletin KK474, Kee Clamp Division, Gascolgne Industrial Products, Ltd., Buffalo, New York.

Stepler, R., *Tube/Clamp System*, Popular Science, pp. 100, 101 Jun., 1977.

*Primary Examiner*—Robert Mackey
*Attorney, Agent, or Firm*—James R. Cypher

[57] ABSTRACT

A clamp-connector for joining tubular members. The tubular members need not be threaded, welded, drilled, or bolted. The clamp-connector consists briefly of a sheet metal bracket formed with quarter-round portions for cradling the tubular members and openings for receiving the clamps. The clamps are standard worm gear clamps with perforated straps.

2 Claims, 2 Drawing Figures

CLAMP-CONNECTOR FOR JOINING THREE TUBULAR MEMBERS AT CORNERS

BACKGROUND OF THE INVENTION

This application is a continuation-in-part of my application Ser. No. 808,044 filed June 20, 1977 now U.S. Pat No. 4,136,984 granted Jan. 30, 1979.

Metal and plastic tubing has come into wide spread usage in constructing racks, stands, railings, benches, tables, shelves, scaffolds, etc. for industrial, commercial and home do-it-yourself projects. Many different connectors have been devised to connect the tubing. Graham, U.S. Pat. No. 885,240, Apr. 21, 1908 and U.S. Pat. No. 885,992, Apr. 28, 1908 provided a cast bracket which connected pipe by inserting bolts through holes drilled in the pipe.

Pittaluga, U.S. Pat. No. 2,696,396, Dec. 7, 1954 and Blu, U.S. Pat. No. 2,711,917, June 28, 1955 provided connectors which in effect were clamps for joining pipes. The connectors would only take one size pipe.

Schwartz, U.S. Pat. No. 3,062,570, Nov. 6, 1962, formed his connector from a sheet metal member but there was no positive connection between the connector and the tubular member. The pipe was held to the connector merely by the friction in the pre-bent cut-out strap-like portions.

SUMMARY OF THE INVENTION

The gist of the present invention is the construction of a novel bracket from sheet metal which in combination with a standard worm gear clamp can be used to construct a wide variety of structures from tubular members or rods.

The present clamp-connector provides an inexpensive means for joining tubular members in the construction of racks, stands, railings, benches, tables, shelves, scaffolds, bracing and many other structures.

The clamp-connector needs only a screw driver to make all the connections and thus it can be used by do-it-yourselfers as well as industrial and commercial applications.

When stainless steel, worm gear clamps are used, the finished project is rigid, of high load capacity, deterioration proof and neat in appearance.

The use of a worm gear clamp rather than a single screw fastener provides increased rigidity and strength.

The clamp-connector system is less expensive since there are no metal castings, no drilling of pipes or pipe threading requirements.

The clamp-connectors may be replaced without unfastening other parts of the structure.

Each clamp or each bracket can be used with several different diameter tubular members.

DESCRIPTION OF THE PREFERRED EMBODIMENT

Figure 1:
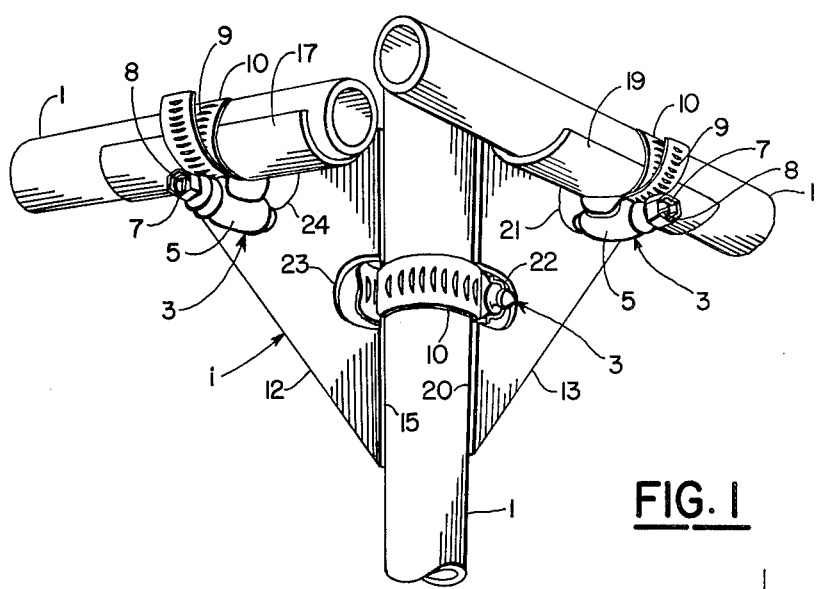
FIG. 1 is a perspective view of a clamp-connector of the present invention.
Figure 2:
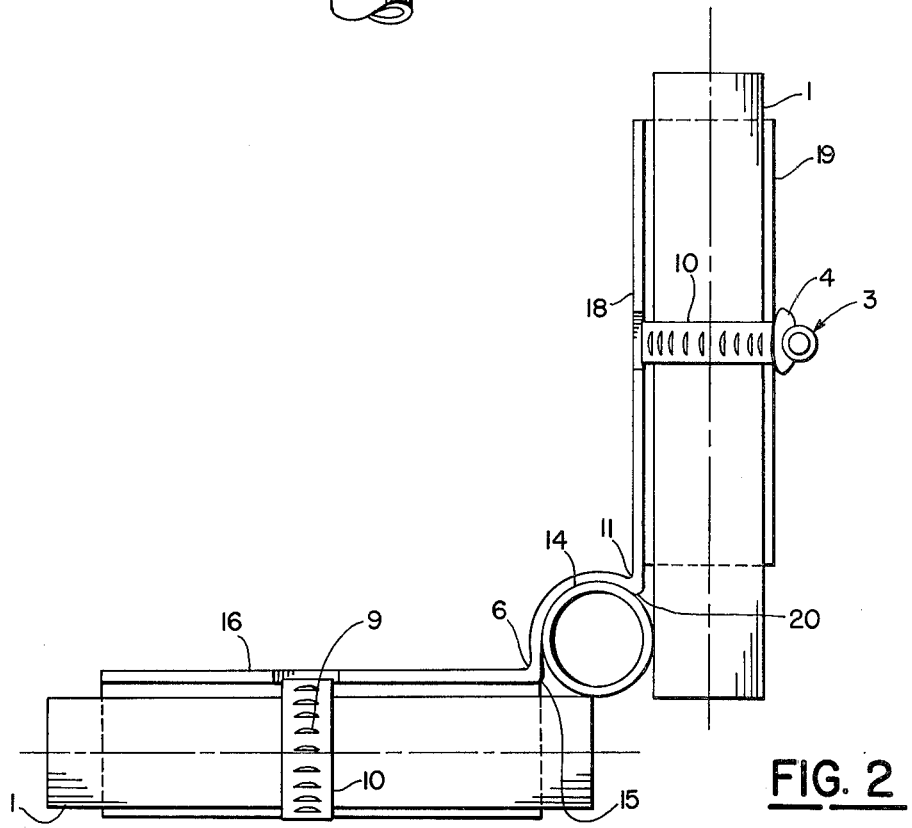
FIG. 2 is a top plan view of the clamp-connector in FIG. 1.

This application discloses a clamp-connector for joining circular tubular members 1. The clamp-connectors include a structural metal bracket i forming three angularly related curved portions and joined by two web portions. The curved portions are adapted for cradling portions of the structual tubular members. At least one clamp opening is formed through the web portion at the intersection of each of the curved portions and the web portions.

Each of the brackets has three clamp means including a strap inserted through the openings and adapted for encircling each of the curved portions and the structural tubular members cradled therein.

The curved portion could nearly encircle the structural tubular member, but preferably, the curved portion is limited to an approximately 90° arc. With the curve portion thus limited, the bracket may accommodate structural tubular members having a range of different diameters. If the curved portion encircled the structural tubular member almost entirely, then the sizes of structural tubular members which could be accommodated would be severely limited.

The clamp means 3 may be standard worm gear clamps made by Wittek Mfg. Co. One of the common uses for this type of clamp is to hold water hoses on automobile heaters and radiators. The clamp means have a worm gear 4 journaled for rotation on a housing 5. The end of the worm gear shanks may be formed with hexagonal heads 7 so that a wrench may be used to turn the worm gear. They also may be formed with slots 8 so that a screw driver can turn the worm gear. The worm gear is mounted so that it engages the slits 9 in the strap 10. As the worm gear is turned, the strap is wound more tightly about the bracket and structural tubular member.

The bracket "i" includes a first web 12 and a second web 13 positioned at right angles to one another and joined at first and second inner edges 6 and 11 to the first and second outer edges 15 and 20 of a first curved portion 14. The first web is formed with a first edge 16 at right angles to the first curved portion and the bracket is formed with a second curved portion 17 adjoining the first edge. The second web 13 is formed with a second edge 18 at right angles to the first curved portion 14 and at right angles to the second curved portion 17 and the bracket "i" is also formed with a third curved portion 19 adjoining the second edge 18. The curved portions are positioned with respect to the web portions so that structural tubular members 1 are cradled in curved portions 17 and 19 and are adapted to intersect one another. The structural tubular member cradled in the first curved portion 14 is not intersected by either of the structural tubular members cradled in the second (17) or third (19) curved portions. Openings 21, 22, 23 and 24 permit receipt of the clamp straps therethrough. Preferably the openings are large enough to permit passage of the clamp housing.

Clamps 3 have straps 10 which encircle the curved portions 14, 17 and 19 and the tubular members 1 cradled therein.

FIG. 1 shows a typical use of the system. Bracket "i" is attached to structural tubular post member 1 by strap 10 of clamp 3. Horizontal structural beam member tubes 1 are connected to the bracket by bands 10 and clamps 3. A shelf may be held by the horizontal structural tubes which can hold articles.

The clamp connector may also be used as a jig in welding pipe. The clamp when used as a pipe jig could be made at any angle required for the welding operation.

Another use of the clamp connector is in constructing a temporary building frame for receiving plastic or fabric sheeting.

I claim:
1. A structural system comprising:
   a. three structural circular elongated tubular members (1);
   b. a bracket member including:
      1. a first triangular web member (12) formed with a straight first inner edge (6) and a straight first edge (16) positioned at right angles to one another and also formed with a first opening (24) adjoining said straight first edge (16) and a second opening (23) adjoining said first inner edge (6),
      2. a second triangular web member (13) formed with a straight second inner edge (11) and a straight second edge (18) positioned at right angles to one another and also formed with a third opening (12) adjoining said straight second edge (18) and a fourth opening (22) adjoining said second inner edge (11),
      3. a first circular quarter-arc elongated curved portion (14) for receiving one of said tubular members (1) having a straight outer edge (15) connected to first inner edge (6) of said first web member (12) and also having a second inner edge (20) joined to said second inner edge (11) of said second web member (13) so that said first and second web member are connected at right angles to one another,
      4. a second elongated circular curved arc portion (17) for receiving another of said tubular members (1) and connected along an edge to said first edge (16) of said straight first web member (12) and positioned at right angles to said first curved portion (14),
      5. a third elongated circular curved arc portion (19) for receiving still another of said tubular members (1) and connected along an edge to said straight second edge (18) of said second web member (13) and positioned at right angles to said first and second curved portions (14), (17),
      6. said curved portions are positioned with respect to said web members so that said structural circular tubular members cradled in said second and third curved portions intersect but said structural tubular member cradled in said first curved portion is not intersected by either of said structural tubular members in said second or third curved portions.
   c. a plurality of clamp members (3), each including:
      1. a strap member (10) formed with a plurality of slits (9) and inserted through said openings (21-24) and encircling said curved portions (14), (17), (19) and said tubular members (1) cradled therein.
      2. a housing (5) formed with a U-shaped member for receiving and holding said strap (10),
      3. a worm gear (4) journaled for rotation within said housing (5) for engaging said slits (9) in said strap (10) and also formed with a tool engaging head for manual rotation of said worm gear;
   d. said clamp members are selected so that a hand tool is capable of pulling said straps (10) in such close fitting frictional engagement around said tubular members (1) and said curved portions (14), (17), (19) that said structural tubular members cannot move with respect to said bracket member.

2. A structural system as described in claim 1 wherein:
   a. said first, second, third and fourth openings are dimensioned to receive said clamp housings and straps therethrough.

* * * * *